UNITED STATES PATENT OFFICE.

WILLIAM A. TORREY, OF MONT CLAIR, NEW JERSEY.

IMPROVEMENT IN COATING AND PRESERVING ROPE AND CORDAGE.

Specification forming part of Letters Patent No. 135,865, dated February 11, 1873.

*To all whom it may concern:*

Be it known that I, WILLIAM A. TORREY, of Mont Clair, in the county of Essex and State of New Jersey, have made a new and useful Improvement in Coating and Preserving Rope and Cordage; and I hereby declare the following to be a full and exact description of the same.

The present method of treating rope and cordage to be used for the rigging of vessels and like exposed situation is to coat it with hot tar or pitch, or some mixture of these with other materials. In order to apply the tar or pitch it must be heated to such a temperature that the fiber of the rope or cordage is very much injured. Careful experiment has shown that rope treated with hot tar or pitch, as now usually employed, is damaged to the extent of about twenty-five per cent. of its effective strength before being treated.

The object of my invention is to prevent this great loss. When it is considered that the amount of rope used in the rigging of vessels alone amounts to thousands of tons, it will easily be understood that a saving of one-fourth of the material, or the giving of the same strength with three-fourths of the weight, is a very important object.

This I accomplish by using a solution of rubber or gutta-percha, or a mixture of rubber or gutta-percha combined with sufficient crude coal-tar, naphtha, dead oil, or other antiseptics, to preserve the composition from decay and mildew. This treatment preserves and water-proofs the rope, and as it may be applied at the ordinary temperature of the air the fibers of the rope retain all their original strength. The composition may be applied either to the rope after it has been manufactured or to the thread or yarn used in making rope.

The following description will enable any one to make and use my invention.

Take raw rubber, cut into pieces of the proper size, and dissolve them in the usual manner by any suitable solvents, such as naphtha, oil of tar, benzine, turpentine, bisulphide of carbon, or mixtures of these, as now well understood in the manufacture of rubber solutions, taking care to add sufficient crude naphtha or dead oil to preserve the compound and the rope to which it is to be applied.

This or other preservative or antiseptic compounds may be applied directly to the rope or the materials from which it is made. Other proper solvents of rubber may be used, and the rubber may be replaced by gutta-percha or other vulcanizable gums, such as balatta, cheekly, and the like.

It will be observed that the thing to be avoided is subjecting the rope to a high temperature so as to impair its strength, as is the case with the present mode of treatment.

Having thus described my invention, what I claim, and desire to secure by Letters Patent of the United States, is—

1. The improved method herein described, for coating and preserving rope and cordage, the same consisting in the application of a solution of India rubber, prepared as set forth.

2. The new article of manufactured rope and cordage coated or saturated with solutions of rubber or other gums at low temperature, as and for the purpose described.

WILLIAM A. TORREY.

Witnesses:
J. W. YOUNG,
JNO. D. PATTEN.